(12) United States Patent
Han et al.

(10) Patent No.: US 9,771,467 B2
(45) Date of Patent: Sep. 26, 2017

(54) THERMOPLASTIC RESIN COMPOSITION AND ARTICLE COMPRISING THE SAME

(71) Applicant: Samsung SDI Co., Ltd., Yongin-si (KR)

(72) Inventors: Hyun Joo Han, Uiwang-si (KR); Ji Hye Lee, Uiwang-si (KR); Joong In Kim, Uiwang-si (KR); Ha Na Ra, Uiwang-si (KR); Su Hak Bae, Uiwang-si (KR); Sung Hee Ahn, Uiwang-si (KR); Min Jeong Lee, Uiwang-si (KR)

(73) Assignee: Lotte Advanced Materials Co., Ltd., Yongin-si (KR)

( * ) Notice: Subject to any disclaimer, the term of this patent is extended or adjusted under 35 U.S.C. 154(b) by 0 days.

(21) Appl. No.: 14/721,293

(22) Filed: May 26, 2015

(65) Prior Publication Data
US 2015/0344670 A1    Dec. 3, 2015

(30) Foreign Application Priority Data
May 30, 2014    (KR) .......................... 10-2014-0066567

(51) Int. Cl.
    *C08K 3/34*    (2006.01)
    *C08K 5/42*    (2006.01)
    *C08K 5/521*   (2006.01)

(52) U.S. Cl.
    CPC .................. *C08K 5/42* (2013.01); *C08K 3/34* (2013.01); *C08K 5/521* (2013.01)

(58) Field of Classification Search
    CPC ........................................................ C08K 5/42
    USPC ......................................................... 524/127
    See application file for complete search history.

(56) References Cited

U.S. PATENT DOCUMENTS

| | | | |
|---|---|---|---|
| 3,953,394 A * | 4/1976 | Fox .......................... | C08L 67/02 260/DIG. 35 |
| 4,246,378 A * | 1/1981 | Kometani ................. | C08K 5/42 524/156 |
| 6,875,812 B1 * | 4/2005 | Akiyama ............. | C08F 297/044 525/133 |
| 2004/0176511 A1 * | 9/2004 | Osamu .................... | C08L 67/02 524/409 |
| 2005/0038145 A1 | 2/2005 | Gallucci et al. | |
| 2006/0084748 A1 | 4/2006 | Gallucci et al. | |
| 2007/0117901 A1 * | 5/2007 | Suzuki ............... | C08L 23/0861 524/442 |
| 2007/0191519 A1 | 8/2007 | Jiao et al. | |
| 2011/0207846 A1 | 8/2011 | Monden | |
| 2012/0245262 A1 | 9/2012 | Hao et al. | |
| 2013/0231437 A1 * | 9/2013 | Cho .......................... | C08J 5/08 524/494 |
| 2014/0050909 A1 * | 2/2014 | Choi ........................ | B32B 7/12 428/217 |

FOREIGN PATENT DOCUMENTS

| | | |
|---|---|---|
| EP | 1860145 A1 | 11/2007 |
| KR | 10-1367088 A | 12/2008 |
| KR | 10-2012-0002991 A | 1/2012 |

OTHER PUBLICATIONS

Office Action in counterpart Korean Application No. 10-2014-0066567 dated Oct. 13, 2016, pp. 1-5.

* cited by examiner

*Primary Examiner* — Doris Lee
(74) *Attorney, Agent, or Firm* — Additon, Higgins & Pendleton, P.A.

(57) ABSTRACT

A thermoplastic resin composition includes a thermoplastic resin comprising a polycarbonate resin; inorganic fillers; and a sulfonate represented by Formula 1:

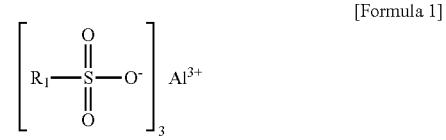

[Formula 1]

wherein $R_1$ is a $C_6$ to $C_{30}$ hydrocarbon group. The thermoplastic resin composition can have excellent impact resistance, rigidity, flame retardance, physical property balance therebetween, and the like.

13 Claims, 1 Drawing Sheet

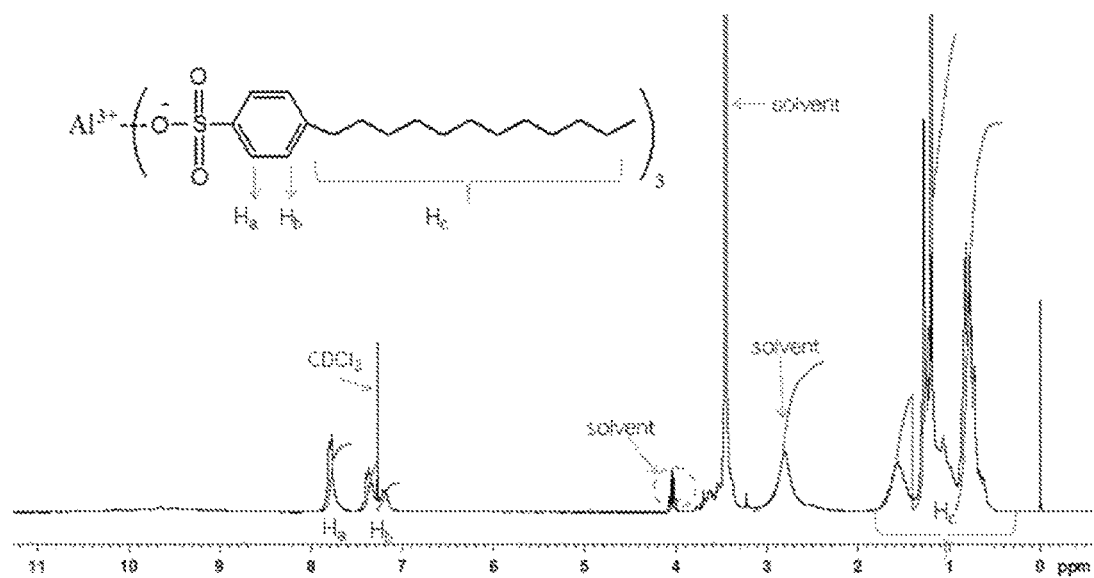

THERMOPLASTIC RESIN COMPOSITION AND ARTICLE COMPRISING THE SAME

CROSS-REFERENCE TO RELATED APPLICATION

This application claims priority under 35 USC Section 119 to and the benefit of Korean Patent Application No. 10-2014-0066567, filed May 30, 2014, the entire disclosure of which is incorporated herein by reference.

FIELD OF THE INVENTION

The present invention relates to a thermoplastic resin composition, and a molded article comprising the same.

BACKGROUND

If a thermoplastic or thermosetting resin is blended with inorganic fillers such as glass fibers, silica, talc and the like, the resin can exhibit improved stiffness, such as tear strength, tensile strength, flexural strength, flexural modulus and the like, due to inherent properties of the inorganic fillers. Typically, a blend of the thermoplastic resins such as polycarbonates, and the like with the inorganic fillers has been used for molded articles requiring high stiffness, especially, as interior materials and exterior materials of vehicles, electric appliances, and electronic devices.

However, when the thermoplastic resin is blended with the inorganic fillers, the thermoplastic resin can suffer from deterioration in fluidity (moldability) and deterioration in appearance, such as protrusion of the inorganic fillers from a surface of a molded article, and the like. To solve such problems, a material capable of controlling interface properties between the thermoplastic resin and the fillers is typically used. Such materials include surfactants, coupling agents and the like, and the interface properties can be controlled in a manner in which one side of the material acts on the thermoplastic resin and the other side thereof acts on the fillers. If the interface properties are controlled, the resin can exhibit improved impact strength, fluidity, and the like.

US Patent Publication No. 2012-0245262 discloses a polycarbonate composition using a sulfonate and inorganic fillers to improve impact properties thereof. EP 1860145 discloses a polysulfone composition using fibrous (acicular) fillers and a sulfonate to improve impact properties thereof.

As such, although the thermoplastic resin can exhibit improved stiffness, impact resistance and the like using the inorganic fillers, the coupling agent and the like, an excess of inorganic fillers can cause the resin to be easily broken at room temperature and it can be difficult to prevent deterioration in elongation, fluidity and the like. In addition, it can be difficult to improve stiffness of the resin despite use of the coupling agent and a compatibilizer, unlike properties such as impact resistance, fluidity and the like.

Therefore, there is a need for a thermoplastic resin composition that exhibits excellent stiffness, excellent impact resistance, and the like.

SUMMARY

The present invention provides a thermoplastic resin composition that can have excellent impact resistance, stiffness, flame retardance, and the like, and a molded article comprising the same.

In exemplary embodiments, the thermoplastic resin composition comprises a thermoplastic resin comprising a polycarbonate resin; inorganic fillers; and a sulfonate represented by Formula 1:

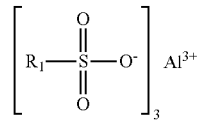

[Formula 1]

wherein $R_1$ is a $C_6$ to $C_{30}$ hydrocarbon group.

In exemplary embodiments, the inorganic fillers may be flake fillers, acicular fillers, or a mixture thereof.

In exemplary embodiments, the flake fillers may be talc, mica, or a mixture thereof, and the acicular fillers may be wollastonite, whisker, glass fibers, basalt fibers, or a mixture thereof.

In exemplary embodiments, the flake fillers may have an average thickness from about 30 nm to about 700 nm, an average particle size from about 0.65 μm to about 5.0 μm, and a ratio of average diameter to average thickness (diameter/thickness) from about 4 to about 30; and the acicular fillers may have an average diameter (D) from about 0.3 μm to about 15 μm, an average length (L) from about 3 μm to about 3000 μm, and a ratio of the average length to the average diameter (L/D) from about 10 to about 200.

In exemplary embodiments, the inorganic fillers may be present in an amount of from about 1 part by weight to about 80 parts by weight based on about 100 parts by weight of the thermoplastic resin, and the sulfonate may be present in an amount of from about 0.1 parts by weight to about 1.0 part by weight based on about 100 parts by weight of thermoplastic resin.

In exemplary embodiments, the thermoplastic resin composition may further comprise about 1 part by weight to about 25 parts by weight of a flame retardant based on about 100 parts by weight of the thermoplastic resin.

In exemplary embodiments, the flame retardant may be a phosphorus flame retardant.

In exemplary embodiments, the thermoplastic resin composition may further comprise at least one of coupling agents, flame retardant aids, lubricants, plasticizers, heat stabilizers, anti-dripping agents, antioxidants, photostabilizers, pigments, and dyes.

In exemplary embodiments, the inorganic fillers may be a mixture of the flake fillers and the acicular fillers.

In exemplary embodiments, the thermoplastic resin composition may have a flexural modulus of from about 30,000 kgf/cm² to about 100,000 kgf/cm² measured according to ASTM D790, an Izod impact strength of from about 5 kgf·cm/cm to about 15 kgf·cm/cm measured on an about ⅛" thick specimen according to ASTM D256, and a falling dart impact (FDI) strength of from about 10 J to about 60 J measured on an about 3.2 mm thick specimen according to a DuPont drop measurement method.

The present invention also relates to a molded article produced from the thermoplastic resin composition.

In exemplary embodiments, the molded article may be a housing for an electronic device having a thickness of from about 0.5 mm to about 3.0 mm.

BRIEF DESCRIPTION OF THE DRAWINGS

FIG. 1 shows a $^1$H-NMR spectrum of aluminum dodecyl benzene sulfonate prepared in Preparative Example 1.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to the present invention can have improved impact resistance and stiffness such as flexural modulus, and the like, and comprises (A) a thermoplastic resin comprising a polycarbonate resin; (B) inorganic fillers; and (C) a sulfonate represented by Formula 1.

(A) Thermoplastic Resin

According to the present invention, the thermoplastic resin may include a polycarbonate resin, and the polycarbonate resin may be used alone, or in combination with another thermoplastic resin that is not the same as the polycarbonate resin.

The polycarbonate resin may be a typical thermoplastic polycarbonate resin. For example, the polycarbonate resin may be an aromatic polycarbonate resin prepared by reacting one or more diphenols (aromatic diol compounds) with a precursor such as phosgene, halogen formates, carbonic acid diesters, and the like.

Examples of diphenols may include without limitation 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and combinations thereof. For example, the diphenol may include 2,2-bis(4-hydroxyphenyl)propane, 2,2-bis(3,5-dichloro-4-hydroxyphenyl)propane, and/or 1,1-bis(4-hydroxyphenyl)cyclohexane, for example 2,2-bis(4-hydroxyphenyl)propane, which is also referred to as bisphenol-A.

The polycarbonate resin may be a branched polycarbonate resin and may be prepared by, for example, reacting about 0.05 mol % to about 2 mol % of a polyfunctional compound containing tri- or higher functional groups, for example, tri- or higher-valent phenol groups, based on the total amount of diphenols used in polymerization.

The polycarbonate resin may be used in the form of a homo-polycarbonate resin, a co-polycarbonate resin, or blends thereof.

In addition, the polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) from about 10,000 g/mol to about 200,000 g/mol, for example, from about 15,000 g/mol to about 40,000 g/mol, without being limited thereto.

Furthermore, the polycarbonate resin may have a melt flow index of from about 5 g/10 min to about 50 g/10 min, for example from about 5 g/10 min to about 30 g/10 min at a temperature of about 300° C. under about 1.2 kg according to ISO 1133. Within this range, the thermoplastic resin composition may have excellent impact resistance, stiffness, and the like.

As the other thermoplastic resin that is not the same as the polycarbonate resin, a typical thermoplastic resin such as a polyester resin, an aromatic vinyl resin, a polyphenylene ether resin, an acrylic resin, a polyamide resin, a polyolefin resin, and the like, and combinations thereof may be used. In exemplary embodiments, polyester resin may be used.

A suitable polyester resin used typically in the thermoplastic resin composition, without limitation, may be used as the polyester resin. The polyester resin may be prepared by polycondensing a dicarboxylic acid compound and a diol compound, and the polycondensation can be easily practiced by those skilled in the art.

Examples of the dicarboxylic acid compound may include without limitation terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, alkyl esters of the foregoing, such as dimethyl terephthalate (hereinafter DMT, an aromatic dicarboxylate with an acid substituted with a dimethyl group, and the like), dimethyl isophthalate, alkylester of naphthalene dicarboxylic acid, such as dimethyl-1,2-naphthalate, dimethyl-1,5-naphthalate, dimethyl-1,6-naphthalate, dimethyl-1,7-naphthalate, dimethyl-1,8-naphthalate, dimethyl-2,3-naphthalate, dimethyl-2,6-naphthalate, and/or dimethyl-2,7-naphthalate, and the like, and mixtures thereof.

Examples of the diol compound may include without limitation $C_2$ to $C_{12}$ diols, for example, ethylene glycol, 1,2-propylene glycol, 1,3-propylene glycol, 2,2-dimethyl-1,3-propylene glycol, 1,3-butanediol, 1,4-butanediol, 1,5-pentanediol, 1,5-pentanediol, 1,6-hexanediol, 1,3-cyclohexanedimethanol, 1,4-cyclohexanedimethanol, and the like, and mixtures thereof.

In exemplary embodiments, the polyester resin may have a melt flow index of from about 5 g/10 min to about 50 g/10 min, for example, from about 5 g/10 min to about 30 g/10 min at a temperature of about 300° C. under about 1.2 kg according to ISO 1133. Within this range, the thermoplastic resin composition may have excellent impact resistance, stiffness, and the like.

In exemplary embodiments, if the thermoplastic resin in addition to the polycarbonate resin such as the polyester resin, and the like is used, it may be present in an amount of from about 1 wt % to about 30 wt %, for example, from about 5 wt % to about 25 wt % based on the total weight (100 wt %) of the thermoplastic resin. In some embodiments, the mixture or combination of polycarbonate resin and the other thermoplastic resin may include the other thermoplastic resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the other thermoplastic resin can be in a range from about any of the foregoing amounts to about any other of the foregoing amounts.

Within this range, the thermoplastic resin composition may have excellent scratch resistance, flexural modulus, abrasion resistance, and the like.

(B) Inorganic Fillers

According to the present invention, the inorganic fillers may include typical flake (lamella-type) fillers and/or acicular (needle-type) fillers. Examples of flake fillers may include talc, mica, and the like, and mixtures thereof, for example, talc, without being limited thereto. Examples of the acicular fillers may include wollastonite, whiskers, glass fibers, basalt fibers, and the like, and mixtures thereof, for example, wollastonite and whiskers, without being limited thereto.

In exemplary embodiments, the wollastonite may be a hydrophobic surface treated wollastonite, and examples of the whiskers may include without limitation potassium titanate whiskers, magnesium sulfate whiskers, calcium carbonate whiskers, aluminum borate whiskers, and the like, and mixtures thereof. In addition, the glass fibers may include a glass fiber reinforcing agent in which fibers are formed by bundling glass filaments coated with a sizing agent, such as epoxy, urethane, and/or silane, without being limited thereto. Herein, the sizing agent may be present in an amount of about 0.05 parts by weight to about 0.1 parts by weight based on about 100 parts by weight of the glass filaments, without being limited thereto.

In exemplary embodiments, the flake fillers have a thin film shape having a small z-axis length (thickness) as compared with a sectional area formed by x-axis and y-axis lengths. In addition, the flake fillers may have an average thickness from about 30 nm to about 700 nm, for example, from about 30 nm to about 300 nm, and as another example from about 32 nm to about 270 nm; an average particle size from about 0.65 μm to about 5.0 μm, for example, from about 0.65 μm to about 2.7 μm, and as another example from about 0.8 μm to about 2.5 μm; and a ratio of an average diameter (average x-axis and y-axis lengths) to the average thickness (z-axis length) (aspect ratio, diameter/thickness) from about 4 to about 30, for example, from about 10 to about 30. As the ratio of the average diameter to average thickness increases, stiffness of the thermoplastic resin composition improves.

For reference, the average particle size of the flake fillers refers to a median value of particle size distribution measured by X-ray transmission. Specifically, the particle size distribution of the flake fillers are obtained by X-ray transmission of sinking particles, followed by calculating the median value, thereby obtaining the average particle size.

In addition, the acicular fillers have an acicular (fibrous) shape, and may have an average diameter (D) from about 0.3 μm to about 15 μm, for example, from about 0.5 μm to about 13 μm, an average length (L) from about 3 μm to about 3,000 μm, for example, from about 5 μm to about 2,600 μm, and a ratio of the average length to the average diameter (aspect ratio, L/D) from about 10 to about 200, for example, from about 20 to about 100. Within this range, the thermoplastic resin composition can exhibit shrinkage stability, high stiffness, and the like.

The thermoplastic resin composition may include the inorganic fillers in an amount of about 1 part by weight to about 80 parts by weight, for example, about 5 parts by weight to about 50 parts by weight, and as another example about 10 parts by weight to about 40 parts by weight, based on about 100 parts by weight of the thermoplastic resin. In some embodiments, the thermoplastic resin composition may include the inorganic fillers in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 parts by weight. Further, according to some embodiments of the present invention, the amount of inorganic fillers can be in a range from about any of the foregoing amounts to about any other of the foregoing amounts.

Within this range, the thermoplastic resin composition can exhibit excellent impact resistance, stiffness, and the like.

In exemplary embodiments, when the flake fillers and the acicular filler are used together, the flake fillers may be present in an amount of about 1 wt % to about 99 wt %, for example, about 10 wt % to about 70 wt %, and as another example about 10 wt % to about 60 wt % based on the total amount (total weight, 100 wt %) of the inorganic fillers, and the acicular fillers may be present in an amount of about 1 wt % to about 99 wt %, for example, about 30 wt % to about 90 wt %, and as another example about 40 wt % to about 90 wt % based on a total amount (total weight, 100 wt %) of the inorganic fillers.

In some embodiments, the mixture or combination of flake fillers and the acicular filler may include the flake fillers in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of flake fillers can be in a range from about any of the foregoing amounts to about any other of the foregoing amounts.

In some embodiments, the mixture or combination of flake fillers and the acicular filler may include the acicular fillers in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of acicular fillers can be in a range from about any of the foregoing amounts to about any other of the foregoing amounts.

Within this range, the thermoplastic resin composition can exhibit excellent impact resistance, stiffness, and the like.

(C) Sulfonate

According to the present invention, the sulfonate serves to control interface properties between the inorganic fillers and the thermoplastic resin and disperse the fillers in the resin, and may be represented by the following Formula 1:

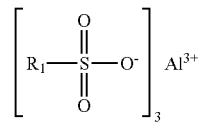

[Formula 1]

wherein $R_1$ is a $C_6$ to $C_{30}$ hydrocarbon group, for example, a $C_6$ to $C_{30}$ alkyl group, a $C_7$ to $C_{30}$ arylalkyl group or a $C_7$ to $C_{30}$ alkylaryl group, for example a $C_{12}$ to $C_{18}$ hydrocarbon group (alkyl group, arylalkyl group, alkylaryl group, and the like).

Examples of the sulfonate may include aluminum dodecylbenzenesulfonate, aluminum octadecylbenzenesulfonate, aluminum decylsulfonate, aluminum octadecylsulfonate, and the like, and mixtures thereof, without being limited thereto.

The sulfonate may be prepared by a typical process of producing the sulfonate, for example, but not limited to, the preparation in the Preparative Example 1 below.

The thermoplastic resin composition may include the sulfonate in an amount of about 0.1 parts by weight to about 1.0 part by weight, for example, about 0.3 parts by weight to about 0.7 parts by weight, based on about 100 parts by weight of the thermoplastic resin. In some embodiments, the thermoplastic resin composition may include the sulfonate in an amount of about 0.1, 0.2, 0.3, 0.4, 0.5, 0.6, 0.7, 0.8, 0.9, or 1.0 part by weight. Further, according to some embodiments of the present invention, the amount of sulfonate can be in a range from about any of the foregoing amounts to about any other of the foregoing amounts.

Within this range, the thermoplastic resin composition can exhibit excellent impact resistance, stiffness, and the like.

According to the present invention, the thermoplastic resin composition may further comprise a flame retardant to improve flame retardance.

The flame retardant may include typical flame retardant used in thermoplastic resin compositions. For example, phosphorus flame retardant may be used. Examples of the phosphorus flame retardants may include without limitation red phosphorus, a phosphate compound, a phosphonate compound, a phosphinate compound, a phosphine oxide compound, a phosphazene compound, a metal salt thereof, and the like. The phosphorus flame retardant may be used alone or in admixture of two or more thereof. In exemplary embodiments, the aromatic phosphoric acid ester compound represented by the following Formula 2 may be used as the phosphorus flame retardant:

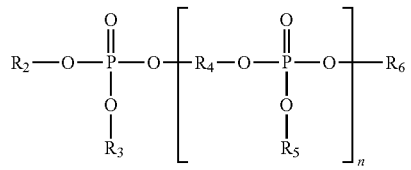

[Formula 2]

wherein, $R_2$, $R_3$, $R_5$ and $R_6$ are the same or different and are each independently a hydrogen atom, a $C_6$-$C_{20}$ aryl group, or a $C_6$-$C_{20}$ aryl group substituted with a $C_1$-$C_{10}$ alkyl group, $R_4$ is a $C_6$-$C_{20}$ arylene group or a $C_6$-$C_{20}$ arylene group substituted with a $C_1$-$C_{10}$ alkyl group, for example, those derived from dialcohol such as resorcinol, hydroquinone, bisphenol-A, bisphenol-S, and the like, and n is an integer of from 0 to 4.

The examples of the aromatic phosphoric acid ester compound represented by Formula 2 may include, if n is 0, for example, diaryl phosphate such as diphenyl phosphate, and the like, triphenyl phosphate, tricresyl phosphate, trixylenyl phosphate, tri(2,6-dimethylphenyl)phosphate, tri(2,4,6-trimethylphenyl)phosphate, tri(2,4-di-tert-butylphenyl) phosphate, and the like, and if n is 1, for example, bisphenol A bis(diphenyl phosphate), resorcinol bis(diphenyl phosphate), resorcinol bis[bis(2,6-dimethylphenyl)phosphate], resorcinol b is [bis(2,4-di-tert-butylphenyl)phosphate], hydroquinone bis[bis(2,6-dimethylphenyl)phosphate], hydroquinone bis[bis(2,4-di-tert-butylphenyl)phosphate], and the like. The aromatic phosphoric acid ester compound may be used alone or in admixture of two or more thereof.

If the flame retardant is used, then it may be present in an amount of from about 1 part by weight to about 25 parts by weight, for example, from about 10 to about 15 parts by weight based on about 100 parts by weight of the thermoplastic resin. In some embodiments, the thermoplastic resin composition may include the flame retardant in an amount of about 1, 2, 3, 4, 5, 6, 7, 8, 9, 10, 11, 12, 13, 14, 15, 16, 17, 18, 19, 20, 21, 22, 23, 24, or 25 parts by weight. Further, according to some embodiments of the present invention, the amount flame retardant can be in a range from about any of the foregoing amounts to about any other of the foregoing amounts.

Within this range, the thermoplastic resin composition may have excellent flame retardance with minimal or no degradation of impact resistance, stiffness, and the like.

According to the present invention, the thermoplastic resin composition may further comprise, as necessary, one or more additives used typically the thermoplastic resin composition such as a coupling agent such as a silane coupling agent, and the like, flame retardant aids, lubricants, plasticizers, heat stabilizers, anti-dripping agents, antioxidants (oxidation stabilizer), photostabilizers, pigments, dyes, and the like. These may be used alone or in admixture of two or more thereof.

In exemplary embodiments, the additives may be present, but not limited to, in an amount of from about 0.1 parts by weight to about 10 parts by weight based on about 100 parts by weight of the thermoplastic resin.

The thermoplastic resin composition of the present invention may have a form of the pellet prepared by mixing and melt extruding the components using a typical twin screw extruder at a temperature of from about 200° C. to about 280° C., for example, from about 250° C. to about 260° C.

The pellet may be prepared into a number of molded articles through a number of molding processes such as an injection molding, an extrusion molding, a vacuum molding, a casting molding, and the like. The molding processes are well known to those skilled in the art.

In exemplary embodiments, the thermoplastic resin composition of the present invention may have a flexural modulus from about 30,000 kgf/cm² to about 100,000 kgf/cm², for example, from about 50,000 kgf/cm² to about 80,000 kgf/cm², according to ASTM D790.

The thermoplastic resin composition may have an Izod impact strength of from about 5 kgf·cm/cm to about 15 kgf·cm/cm, for example, from about 6 kgf·cm/cm to about 10 kgf·cm/cm, measured on an about ⅛" thick specimen according to ASTM D256.

In addition, the thermoplastic resin composition may have a falling dart impact (FDI) strength (crack generation energy) from about 10 J to about 60 J, for example, from about 15 J to about 40 J, as measured on an about 1 mm thick specimen (about 10 cm×about 10 cm×about 1 mm) using an about 2 kg dart in accordance with the Dupont drop measurement method, in which a maximum height not generating a crack is measured by adjusting a height of the dart, followed by converting the maximum height into potential energy. Here, the maximum height not generating a crack is obtained in such a manner that a dart having a certain weight is dropped onto the about 1 mm thick specimen from a varying height, followed by observing generation of cracks in the specimen by the naked eye.

A molded article according to the present invention may be prepared from the polycarbonate resin composition through a number of molding processes, and may have excellent stiffness, impact resistance, flame retardance, physical property balance therebetween, and the like. Moreover, the molded article may be used for an electrical/electronic product, an interior/exterior material of a vehicle, and the like requiring high stiffness and high impact properties, for example, a housing for an electronic device (a thin film type exterior material) having a thickness of about 0.5 mm to about 3.0 mm.

Hereinafter, the present invention will be described in more detail with reference to the following Examples.

However, it should be understood that these examples are provided for illustration only and the scope of the present invention is not limited to the following Examples. Details not described herein that can be inferred sufficiently and technically from the present invention by those skilled in the art are omitted.

EXAMPLES

Preparative Example 1

Preparation of Sulfonate 350 g of dodecyl benzene sulfonic acid is dissolved in 300 mL of ethanol while heating to a temperature of 40° C., and to the solution 70 g of aluminum isopropoxide is slowly added, stirred and heated. The solution is reacted for 3 hours while heating to about 80° C. and maintaining this temperature, and the reactants are allowed to cool to the ambient temperature and filtered to remove the impurities. A vacuum distillation unit is used to remove ethanol and the resulting isopropyl alcohol from the solution in which the impurities are removed, and prepare aluminum dodecyl benzene sulfonate. The prepared aluminum dodecyl benzene sulfonate may be used as a 50-80% diluted alcoholic solution, or as a vacuum dried powder. The decision on whether the reaction of aluminum dodecyl benzene sulfonate is completed is made by comparing the isopropoxide proton shift of the reactants and the product by a 1H-NMR spectrum (see FIG. 1). In addition, a thermal gravimetric analysis (TGA) and an inductively coupled plasma (ICP) are used to calculate the content of aluminum dodecyl benzene sulfonic acid in the reaction solution. The analysis results of ICP of the product are shown in Table 1.

TABLE 1

| Sample weight (g) | | 0.106 |
|---|---|---|
| Diluent weight(g) | | 109.904 |
| Ion content (mg/kg) | Al | 19578.9 |
| | Ca | N.D. |
| | Mg | N.D. |
| | Na | N.D. |
| | Zn | N.D. |

N.D.: None Detected

Hereinafter, the components of Examples and Comparative Examples are as follows.
(A) Thermoplastic Resin
(A-1) Polycarbonate Resin
Bisphenol-A polycarbonate (Manufacturer: Cheil Industries Inc., Trade name: PC-03-SC-1190G, melt flow index (MI, measured at 300° C. under 1.2 kg according to ISO 1133): 30 g/10 min) is used.

(A-2) Polyester Resin
Polybutylene terephthalate (Manufacturer: SHINKONG, Trade name: Shinite K001, melt flow index (MI, measured at 240° C. under 1.0 kg according to ISO 1133): 18 g/10 min) is used.
(B) Inorganic Filler
(B-1) Flake filler: Talc (Manufacturer: KOCH Co., Ltd., Trade name: KC-3000) is used.
(B-2) Acicular filler: Wollastonite (Manufacturer: NYCO Co., Ltd., Trade name: 4W) is used.
(C) Sulfonate
(C-1) Aluminum dodecyl benzene sulfonate of Preparative Example 1 is used.
(C-2) Sodium dodecyl benzene sulfonate (Manufacturer: TCI, Trade name: D0990) is used.
(C-3) Potassium dodecyl benzene sulfonate (Manufacturer: Geo-Young Corporation, Trade name: DBC70M) is used.
(D) As a calcium salt, calcium stearate (CA-ST, Manufacturer: Songwon Industrial Co., Ltd., Trade name: SC-110) is used.
(E) Flame retardant: A mixture of the phosphorus flame retardant (a mixture of CR-741 and PX-200 from DAIHACHI Chemical Industry Co., Ltd., mixing ratio (weight ratio) of 19:1) is used.

Examples 1 to 14 and Comparative Examples 1 to 10

Pellets are prepared by adding the components in the amounts as shown in Tables 2 and 5 and extruding at a temperature of 200 to 280° C. A twin screw extruder with L/D=36 and a diameter of 45 mm is used to carry out the extrusion, and the prepared pellets are dried at 100° C. for 4 hours or more and injected in a 6 ounce injector (molding temperature of 260° C. and mold temperature of 60° C.) to prepare a specimen. The prepared specimen is evaluated for the physical properties according to the following method, and the results thereof are shown in Tables 2 to 5.
Evaluation of Properties
(1) Izod impact strength (unit: kgf·cm/cm): Izod impact strength is measured on a ⅛" thick notched Izod specimen in accordance with ASTM D256.
(2) Falling dart impact (FDI) strength (unit: J): FDI strength is measured by measuring a height for generating a crack in a 1.0 mm thick specimen (10 cm×10 cm×1 mm) using a 2 kg dart in accordance with the Dupont drop measurement method, followed by converting the height into energy.
(3) Flexural modulus (unit: kgf/cm$^2$): Flexural modulus is determined at 2.8 mm/min according to ASTM D790.
(4) Flame retardance: Flame retardance is determined using five 1.2 mm thick bars according to UL 94 inflammability test standard.

TABLE 2

| | | | Examples | | | | | Comparative Examples | | | |
|---|---|---|---|---|---|---|---|---|---|---|---|
| | | | 1 | 2 | 3 | 4 | 5 | 1 | 2 | 3 | 4 |
| Composition | (A-1) | (pbw) | 100 | 100 | 100 | 100 | 100 | 100 | 100 | 100 | 100 |
| | (B-1) | (pbw) | 25 | 25 | 25 | 25 | 25 | 25 | 25 | 25 | 25 |
| (C) | (C-1) | | 0.2 | 0.3 | 0.4 | 0.5 | 0.7 | — | — | — | — |
| (pbw) | (C-2) | | — | — | — | — | — | — | 0.5 | — | — |
| | (C-3) | | — | — | — | — | — | — | — | 0.5 | — |
| | (D) (pbw) | | — | — | — | — | — | — | — | — | 0.5 |

TABLE 2-continued

|  |  | Examples | | | | | Comparative Examples | | | |
|---|---|---|---|---|---|---|---|---|---|---|
|  |  | 1 | 2 | 3 | 4 | 5 | 1 | 2 | 3 | 4 |
| Physical properties | Izod impact strength | 5.2 | 6.5 | 7.1 | 7.5 | 7.8 | 3.5 | 4.4 | 4.8 | 3.3 |
|  | FDI strength | 10 | 13 | 15 | 20 | 23 | 2 | 7 | 7 | 1 |

TABLE 3

|  |  |  | Examples | Comparative Examples | |
|---|---|---|---|---|---|
|  |  |  | 6 | 5 | 6 |
| Composition | (A) (pbw) | (A-1) | 80 | 80 | 80 |
|  |  | (A-2) | 20 | 20 | 20 |
|  | (B-1) pbw |  | 25 | 25 | 25 |
|  | (C-1) (pbw) |  | 0.5 | — | — |
|  | (D) (pbw) |  | — | — | 0.5 |
| Physical properties | Izod impact strength |  | 6.5 | 4.2 | 3.2 |
|  | FDI strength |  | 15 | 4 | 2 |
|  | Flexural modulus |  | 44900 | 51200 | 44300 |

TABLE 4

|  |  | Examples | | | | | | Comparative Examples | |
|---|---|---|---|---|---|---|---|---|---|
|  |  | 7 | 8 | 9 | 10 | 11 | 12 | 7 | 8 |
| Composition | (A-1) (pbw) | 100 | 100 | 100 | 100 | 100 | 100 | 100 | 100 |
|  | (B) (B-1) | 17.6 | 17.6 | 17.6 | 17.6 | 17.6 | 14 | 11.1 | 11.1 |
|  | (pbw) (B-2) | 11.1 | 11.1 | 11.1 | 11.1 | 11.1 | 29 | 17.6 | 17.6 |
|  | (C-1) (pbw) | 0.1 | 0.2 | 0.3 | 0.4 | 0.5 | 0.5 | — | — |
|  | (D) (pbw) | — | — | — | — | — | — | — | 0.5 |
| Physical properties | Izod impact strength | 7.7 | 8.5 | 8.7 | 9 | 9.4 | 8.1 | 3.9 | 3.5 |
|  | FDI strength | 10 | 14 | 20 | 23 | 29 | 21 | 2 | 0.5 |
|  | Flexural modulus (×10³) | 53.6 | 51.3 | 50.7 | 52.4 | 50.3 | 63.3 | 48.0 | 63.6 |

TABLE 5

|  |  |  | Examples | | Comparative Examples | |
|---|---|---|---|---|---|---|
|  |  |  | 13 | 14 | 9 | 10 |
| Composition | (A-1) (pbw) |  | 100 | 100 | 100 | 100 |
|  | (B-1) (pbw) |  | 25 | 25 | 25 | 25 |
|  | (C) (pbw) | (C-1) | 0.3 | 0.5 | — | — |
|  |  | (C-2) | — | — | 0.3 | 0.5 |
|  | (E) (pbw) |  | 21 | 21 | 21 | 21 |
| Physical properties | Izod impact strength |  | 9.0 | 9.8 | 8.0 | 8.5 |
|  | FDI strength |  | 40 | 48 | 44 | 46 |
|  | Flexural modulus |  | 33000 | 32000 | 30900 | 30600 |
|  | Flame retardance/ 1.2 mm (total burning time, s) |  | V-0 (25) | V-0 (26) | V-1 (59) | V-1 (109) |

The results demonstrate that the thermoplastic resin composition of the present invention can have excellent Izod impact strength and FDI strength (impact resistance), stiffness (flexural modulus), physical property balance therebetween, and the like. Furthermore, when the flame retardant is used, the results also demonstrate that the thermoplastic resin composition of the present invention can have more excellent flame retardance.

Many modifications and other embodiments of the invention will come to mind to one skilled in the art to which this invention pertains. Therefore, it is to be understood that the invention is not to be limited to the specific embodiments disclosed and that such modifications and other embodiments are intended to be included within the scope of the appended claims.

What is claimed is:

1. A thermoplastic resin composition comprising:
   a thermoplastic resin comprising a polycarbonate resin;
   inorganic fillers comprising talc or a combination of talc and wollastonite in an amount of from about 25 part by weight to about 43 parts by weight based on about 100 parts by weight of the thermoplastic resin; and
   a sulfonate represented by Formula 1 in an amount of from about 0.2 parts by weight to about 0.7 part by weight based on about 100 parts by weight of the thermoplastic resin:

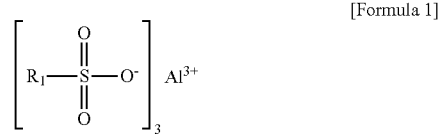

[Formula 1]

wherein $R_1$ is a dodecyl phenyl group wherein thermoplastic resin composition has a flexural modulus of from about 30,000 kgf/cm² to about 100,000 kgf/cm² measured according to ASTM D790, an Izod impact strength of from about 5 kgf·cm/cm to about 15 kgf·cm/cm measured on an about ⅛" thick specimen according to ASTM D256, and a falling dart impact (FDI) strength of from about 10 J to about 60 J measured on an about 3.2 mm thick specimen according to a DuPont drop measurement method.

2. The thermoplastic resin composition according to claim 1, wherein the talc fillers have an average thickness from about 30 nm to about 700 nm, an average particle size from about 0.65 µm to about 5.0 µm, and a ratio of average diameter to average thickness (diameter/thickness) from about 4 to about 30; and the wollastonite fillers have an average diameter (D) from about 0.3 µm to about 15 µm, an average length (L) from about 3 µm to about 3000 µm, and a ratio of the average length to the average diameter (L/D) from about 10 to about 200.

3. The thermoplastic resin composition according to claim 1, further comprising at least one of coupling agents, flame retardant aids, lubricants, plasticizers, heat stabilizers, anti-dripping agents, antioxidants, photostabilizers, pigments, and dyes.

4. The thermoplastic resin composition according to claim 1, wherein:
the inorganic fillers consist of talc.

5. The thermoplastic resin composition according to claim 1, wherein the inorganic fillers comprise a mixture of talc and wollastonite.

6. The thermoplastic resin composition according to claim 5, wherein the mixture of talc and wollastonite comprises talc in an amount of about 60 to about 99 wt %.

7. The thermoplastic resin composition according to claim 1, wherein the thermoplastic resin comprises polycarbonate resin and optionally another resin that is not the same as the polycarbonate resin in an amount of about 1 to about 30 wt %, based on the total weight of the thermoplastic resin.

8. The thermoplastic resin composition according to claim 7, wherein the other resin that is not the same as the polycarbonate resin is a polyester resin.

9. The thermoplastic resin composition according to claim 1, further comprising about 1 part by weight to about 25 parts by weight of a flame retardant based on about 100 parts by weight of the thermoplastic resin.

10. The thermoplastic resin composition according to claim 9, wherein the flame retardant is a phosphorus flame retardant.

11. The thermoplastic resin composition according to claim 10, wherein the thermoplastic resin has a flame retardance rating of V-0 determined using five 1.2 mm thick bars according to UL 94 inflammability test standard.

12. A molded article produced from the thermoplastic resin composition according to claim 1.

13. The molded article according to claim 12, wherein the molded article is a housing for an electronic device having a thickness of from about 0.5 to about 3.0 mm.

* * * * *

UNITED STATES PATENT AND TRADEMARK OFFICE
CERTIFICATE OF CORRECTION

PATENT NO. : 9,771,467 B2
APPLICATION NO. : 14/721293
DATED : September 26, 2017
INVENTOR(S) : Hyun Joo Han et al.

It is certified that error appears in the above-identified patent and that said Letters Patent is hereby corrected as shown below:

In the Claims

Claim 1, Column 12, delete Line 55 and insert:
--wherein $R_1$ is a dodecyl phenyl group wherein the thermo- --

Signed and Sealed this
Twenty-ninth Day of May, 2018

Andrei Iancu
*Director of the United States Patent and Trademark Office*